United States Patent [19]
Takahashi et al.

[11] Patent Number: 5,321,790
[45] Date of Patent: Jun. 14, 1994

[54] OPTICAL ATTENUATOR USING AN OPTICAL FIBER AND METHOD AND APPARATUS FOR PRODUCING THE SAME

[75] Inventors: Mitsuo Takahashi; Kunio Yamada, both of Matsudo; Naotoshi Shiokawa, Kamagaya, all of Japan

[73] Assignee: Seikoh Giken Co., Ltd., Matsudo, Japan

[21] Appl. No.: 861,937

[22] Filed: Apr. 2, 1992

[30] Foreign Application Priority Data

Oct. 11, 1991 [JP] Japan .................. 3-292438

[51] Int. Cl.$^5$ ........................ G02B 6/10
[52] U.S. Cl. .................... 385/140; 385/146; 385/123
[58] Field of Search .......... 385/43, 96, 66, 67, 385/68, 84, 85, 123, 140, 146; 65/1, 2, 3.1, 3.11, 12

[56] References Cited

U.S. PATENT DOCUMENTS

| | | | |
|---|---|---|---|
| 4,557,557 | 12/1985 | Gleason et al. | 385/140 |
| 4,763,976 | 8/1988 | Nolan et al. | 385/43 |
| 4,957,343 | 9/1990 | Sato et al. | 385/96 |
| 5,044,716 | 9/1991 | Berkey | 385/43 |
| 5,054,874 | 10/1991 | Hill et al. | 385/43 |
| 5,171,345 | 12/1992 | Takemura | 385/43 |

FOREIGN PATENT DOCUMENTS

| | | | |
|---|---|---|---|
| 1-50003 | 2/1989 | Japan | 385/140 |
| 2-228609 | 9/1990 | Japan | 385/140 |

*Primary Examiner*—John D. Lee
*Assistant Examiner*—John Ngo
*Attorney, Agent, or Firm*—Spencer, Frank & Schneider

[57] ABSTRACT

An optical attenuator comprising an optical fiber and at least a light attenuating portion disposed on the optical fiber. The light attenuating portion is formed such that a part of the optical fiber is heated by an opposing pair of discharge electrodes or gas burners and then compressed in the axial direction to provide a spherically contoured light attenuating portion or pulled in the axial direction to provide a light attenuating portion having a reduced diameter. In addition, a method and an apparatus for producing an optical fiber of the foregoing type are disclosed. The method is practiced by way of the steps of heating a part of an optical fiber and then physically deforming the heated part to serve as a light attenuating portion by compressing or pulling it in the axial direction. The apparatus includes as essential components a stationary clamp jig, and a movable clamp jig arranged opposite to the stationary clamp jig and an opposing pair of discharge electrodes or gas burners for heating a part of the optical fiber. The movable clamp jig is displaced toward or away from the stationary clamp jig by rotationally actuating a micrometer.

6 Claims, 3 Drawing Sheets

OPTICAL ATTENUATOR USING AN OPTICAL FIBER AND METHOD AND APPARATUS FOR PRODUCING THE SAME

BACKGROUND OF THE INVENTION

1. Field of the Invention

The present invention relates generally to an optical attenuator using an optical fiber employable in an optical fiber communication circuit system. More particularly, the present invention relates to an optical attenuator of the foregoing type which assures that reflected return light loss is minimized. Further, the present invention relates to a method and an apparatus for producing an optical attenuator of the foregoing type.

2. Description of the Related Art

As is well known by any expert in the art, various kinds of stationary type optical attenuators each usable for attenuating a quantity of light beam to pass through an optical fiber communication circuit have been hitherto put in practical use.

To facilitate understanding of the present invention, typical conventional optical attenuators will briefly be described below with reference to FIG. 5(a) and FIG. 5(b).

FIG. 5(a) is a sectional side view which illustrates by way of example the structure of an air gap type optical attenuator.

Ferrules 35 and 36 include central holes, respectively, through which optical fibers 33 and 34 with sheaths 31 and 32 removed therefrom are inserted. After completion of the inserting operation, the optical fibers 33 and 34 are immovably held in the corresponding central holes with the aid of an adhesive. Subsequently, end surfaces of both the ferrules 35 and 36 are ground and polished to assume a predetermined contour, respectively.

While the ferrules 35 and 36 are inserted into an alignment sleeve 37 together with the optical fibers 33 and 34 from the opposite sides of the alignment sleeve 37, a predetermined quantity of light attenuation is attained by properly adjusting a distance S between the end surfaces of the ferrules 35 and 36 to vary the quantity of light to be attenuated in proportion to the distance S.

Next, FIG. 5(b) is a sectional side view which illustrates by way of example the structure of a vaporized metal deposited film type optical attenuator. A stationary type optical attenuator of the aforementioned type has the optical attenuator shown in FIG. 5(a) utilized therefor. A glass plate 38 plated with a vaporized metal to assume a predetermined attenuation value is first placed in the interior of an alignment sleeve 37, and ferrules 35 and 36 are then inserted into the alignment sleeve 37 from the opposite sides of the same until the foremost ends of the ferrules 35 and 36 come in contact with the glass plate 38 (see Light Guide Digest, NO. 2, 1990, published by AT & T).

With respect to the conventional stationary type optical attenuators as mentioned above, a so-called reflected return light loss arises when an optical signal generated from a light source is reflected at the joint end surface of an optical fiber and then returns to the light source again. The loss has been hiterto noted as a common problem to conventional optical attenuators.

Since the reflected return light causes the light source to oscillate unstably, and moreover, it becomes a factor in inducing a noise signal, the reflected return light loss is a serious problem especially for an optical fiber communication circuit system having a large capacity for operating within a wide range.

It has been found that in a case where the end surface of an optical fiber is ground and polished at a right angle relative to an optical axis of the optical fiber, there arises a reflected return light loss of $-10$ dB (which corresponds to about 10%).

To solve the problem of referenced return light loss as mentioned above, a proposal has been made with respect to a method of slantwise grinding and polishing the end surface of an optical fiber with an angle of eight degrees or more as measured from a plane extending at a right angle relative to an optical axis of the optical fiber so as to allow reflected light to be introduced into a clad of the optical fiber while reducing the quantity of reflected light returned to the light source. When this method is employed, the reflected return light loss is reduced to a level of $-60$ dB (which corresponds to about 0.0001%). This means that the reflected return light loss can be reduced remarkably by employing the method as mentioned above.

However, it has been found that the conventional air gap type optical, attenuator has a problem that the quantity of multiple light reflections emitted from the surfaces of optical fibers located opposite to each other is liable to vary depending on the environmental temperature, and the aforementioned problem causes the light attenuation value of the optical attenuator to vary unstably.

In addition, it has been found that the conventional vaporized metal deposited film type optical attenuator has drawbacks in that it is difficult to control exactly production of each optical attenuator while maintaining a thickness of each film within a certain range to ensure a specified attenuation value. The film is easily injured or scratched when a ferrule is mounted on and dismounted from the optical attenuator, and moreover, there is not practically available any method of repairing an injured or scratched film no matter how it is scratched or injured.

SUMMARY OF THE INVENTION

The present invention has been made with the foregoing background in mind.

An object of the present invention is to provide an optical attenuator using an optical fiber which assures that a reflected return light loss arising at a light attenuating portion disposed on the optical fiber is substantially reduced to a level of zero without an occurrence of multiple reflections.

Another object of the present invention is to provide an optical attenuator of the aforementioned type which assures that variation of a light attenuation value attributable to multiple reflection is substantially reduced, and moreover, the end surface of each ferrule is not injured or scratched as it is unnecessary repeatedly perform a mounting/dismounting operation or a contacting operation with the ferrules.

Another object of the present invention is to provide a method of producing an optical attenuator of the aforementioned type.

A further object of the present invention is to provide an apparatus for producing an optical attenuator of the aforementioned type.

A still further object of the present invention is to provide a stationary type optical attenuator for which an optical fiber with a sheath removed therefrom is used.

According to a first aspect of the present invention, there is provided an optical attenuator using an optical fiber wherein the optical attenuator comprises an optical fiber and at least a spherically contoured light attenuating portion disposed on the optical fiber, the light attenuating portion being formed such that a part of the optical fiber is heated with the aid of heating means and then compressed in the axial direction of the optical fiber.

Alternatively, an optical attenuator of the aforementioned type comprises an optical fiber and at least a light attenuating portion disposed on the optical fiber while having a reduced diameter, the light attenuating portion being formed such that a part of the optical fiber is heated with the aid of heating means and then pulled in the axial direction of the optical fiber.

Usually, the heating means comprises an opposing pair of discharge electrodes arranged on opposite sides of the optical fiber with the same distance maintained between each electrode and the optical fiber to generate arcs with the discharge electrodes. Alternatively, the heating means may comprise an opposing pair of gas burners arranged in the same manner as mentioned above.

According to a second aspect of the present invention, there is provided an optical attenuator which comprises a glass tube made of quartz; an optical fiber with a sheath partly removed therefrom, the optical fiber being airtightly encapsulated together with sheaths in the glass tube; and at least a spherically contoured light attenuating portion disposed on the optical fiber, the light attenuating portion being formed such that a part of the optical fiber is heated and then compressed in the axial direction of the optical fiber.

According to a third aspect of the present invention, there is provided an optical attenuator serving as an optical connector plug wherein the optical attenuator comprises a ferrule including a flange portion and having an axially extending central hole formed therein; an optical fiber inserted through the central hole in the ferrule; at least a light attenuating portion disposed on the optical fiber while having a reduced diameter, the light attenuating portion being formed such that a part of the optical fiber is heated and then pulled in the axial direction of the optical fiber; a coupling nut having a plurality of female threads formed therein, the coupling nut being rotatably fitted around the ferrule; and a snap ring serving as a stopper the snap ring being fitted around the flange portion of the ferrule so as to prevent the coupling nut from being disconnected from the ferrule.

According to a fourth aspect of the present invention, there is provided a method of producing an optical attenuator using an optical fiber wherein the method comprises a step of heating a part of an optical fiber with the aid of heating means, the part of the optical fiber serving as a light attenuating portion; and a step of physically deforming the part of the optical fiber in the axial direction of the same while it is kept hot.

Usually, the heating means for carrying out the step of heating comprises an opposing pair of discharge electrodes arranged on the opposite sides of the optical fiber with the same distance maintained between each electrode and the optical fiber to generate arcs with the discharge electrodes. Alternatively, the heating means for carrying out the step of heating may comprise an opposing pair of gas burners arranged on the opposite sides of the optical fiber with the same distance maintained between each gas burner and the optical fiber to generate gas flames with the gas burner.

Additionally, the step of physically deforming is carried out by compressing the part of the optical fiber in the axial direction of the same while it is kept hot. Alternatively, the step of physically deforming is carried out by pulling the part of the optical fiber in the axial direction while it is kept hot.

According to a fifth aspect of the present invention, there is provided an apparatus for producing an optical attenuator using an optical fiber wherein the apparatus comprises a stationary clamp jig including a retaining member for immovably holding an optical fiber; a movable clamp jig including a retaining member for immovably holding the optical fiber, the movable clamp jig being arranged on a platform opposite to the stationary clamp jig in alignment with the same so as to be finely displaced toward or away from the stationary clamp jig by actuating displacing means while the optical fiber is bridged between both the clamp jigs; and heating means arranged at the intermediate position between both the clamp jigs to heat a part of the optical fiber thereby to thermally deform it while it is kept hot.

Usually, the displacing means comprises a micrometer adapted to be rotationally actuated with an operator's hand for finely displacing the movable clamp jig by a predetermined distance.

The heating means comprises an opposing pair of discharge electrodes arranged on the opposite sides of the optical fiber to generate arcs with discharge electrodes. Alternatively, the heating means may comprise an opposing pair of gas burners arranged in the same manner as mentioned above.

To immovably hold the optical fiber bridged between both the clamp jigs, it is preferable that a V-shaped groove is formed on the upper surface of each of the clamp jigs.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments of the present invention.

Figure 1A:
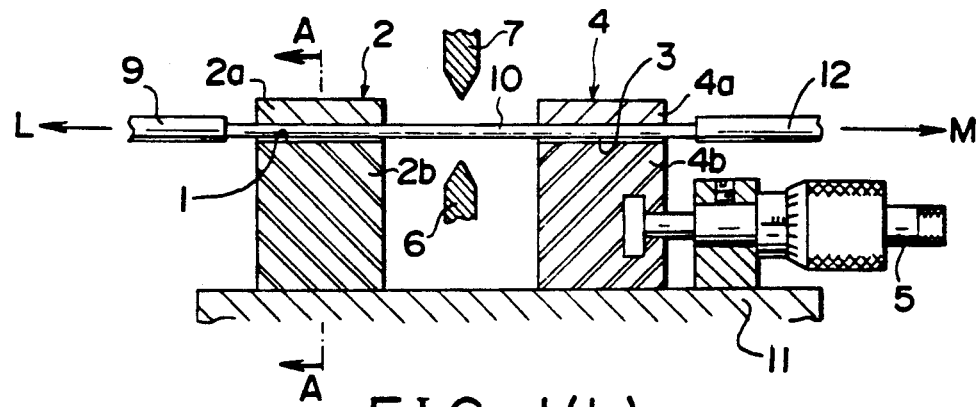
FIG. 1(a) is a schematic sectional side view of an apparatus for producing an optical attenuator using an optical fiber in accordance with a first embodiment of the present invention, particularly illustrating that an optical fiber is placed on the apparatus.
Figure 1B:
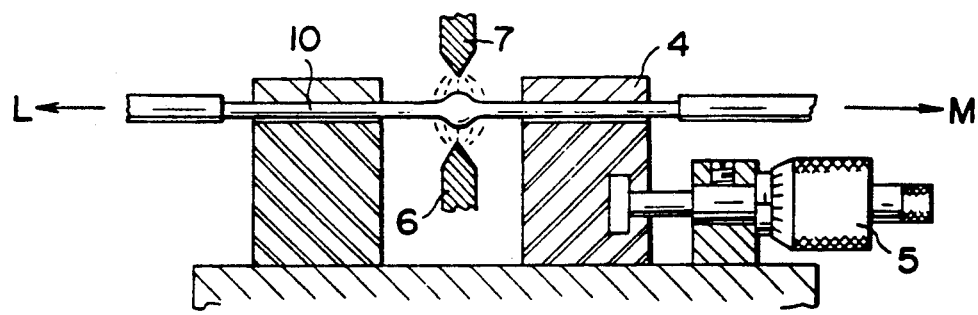
FIG. 1(b) is a schematic sectional side view of the apparatus similar to FIG. 1(a), particularly illustrating that a part of the optical fiber is thermally deformed to produce a substantially spherical light attenuating portion.

First, an apparatus for producing an optical attenuator using an optical fiber in accordance with a first embodiment of the present will be described below with reference to FIGS. 1(a) and 1(b) wherein FIG. 1(a) is a schematic sectional side view of the apparatus, particularly illustrating that an optical fiber with a sheath removed therefrom is placed on the apparatus with a horizontal attitude and FIG. 1(b) is a schematic sectional side view of the apparatus similar to FIG. 1(a), particularly illustrating that a light attenuating portion is thermally formed on the optical fiber while exhibiting a substantially spherical contour.

As is apparent from FIG. 1(a), a stationary clamp jig 2, a movable clamp jig 4 and a micrometer 5 for finely displacing the movable clamp jig 4 are arranged on a platform 11. It should be noted that the stationary clamp jig 2 and the micrometer 5 are immovably held on the platform 11.

Figure 2A:
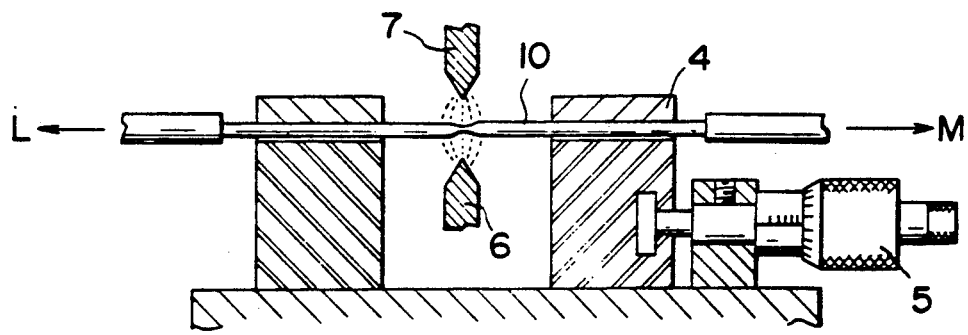
FIG. 2(a) is a schematic sectional side view of the apparatus similar to FIG. 1(a), particularly illustrating that a part of the optical fiber is thermally deformed to produce a light attenuating portion having a reduced diameter.
Figure 2B:
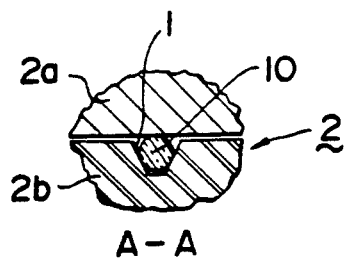
FIG. 2(b) is a fragmentary sectional view of a stationary clamp jig constituting the apparatus shown in FIG. 1(a)

As is best seen in FIG. 2(b), the stationary clamp jig 2 is constructed of a base portion 2b having a V-shaped groove 1 formed on the upper surface thereof and a retaining member 2a for firmly retaining an optical fiber 10. Similarly, the movable clamp jig 4 is constructed of a base portion 4b having a V-shaped groove 3 formed on the upper surface thereof and a retaining member 4a, and as shown in the drawing, the movable clamp jig 4 is located at the position opposite to the stationary clamp jig 2 on the platform 11.

The foremost end of the micrometer 5 is fixedly secured to the movable clamp jig 4 so as to finely adjust the distance between the stationary clamp jig 2 and the movable clamp jig 4 by rotationally actuating the micrometer 5 with an operator's hand.

It should be added that any one of an electric motor for controlling a counting operation and a piezo element may be substituted for the micrometer 5 for the same purpose.

An opposing pair of discharge electrodes 6 and 7 each serving as a part of a heating means are arranged at the intermediate position between the stationary clamp jig 2 and the movable clamp jig 4. An opposing pair of gas burner nozzles each serving as a heating unit may be substituted for the opposing pair of discharge electrodes 6 and 7 for the same purpose.

Next, the steps of producing an optical attenuator of the present invention will be described below.

First, a part of a sheath 9 and a part of a sheath 12 are removed from a longitudinally extending optical fiber 10. Subsequently, the optical fiber 10 is bridged between the stationary clamp jig 2 and the movable clamp jig 4 while it is received in the V-shaped grooves 1 and 3. Thereafter, the optical fiber 10 is immovably held on both the clamp jigs 2 and 4 by depressing the retaining members 2a and 4a by tightening bolts (not shown).

A light source L (not shown) is coupled to one outermost end of the optical fiber 10, while a power meter M (not shown) is coupled to the other outermost end of the same.

Subsequently, the positions assumed by the opposing pair of discharge electrodes 6 and 7 are properly adjusted such that a predetermined part on the optical fiber 10 to be used as a light attenuating portion is correctly located on a line extending between both the discharge electrodes 6 and 7 arranged in the equally spaced relationship relative to the optical fiber 10.

As shown in FIG. 1(b), the foregoing predetermined part, i.e., the light attenuating portion on the optical fiber 10 is thermally deformed to assume a substantially spherical contour. To this end, both the discharge electrodes 6 and 7 are electrically activated to generate discharge arcs therefrom, causing the optical fiber 10 to be locally heated and softened. Thereafter, the micrometer 5 is rotationally actuated to displace the movable clamp jig 4 in the compressing direction by a predetermined distance, whereby the heated part of the optical fiber 10 is deformed to exhibit a substantially spherical contour.

FIG. 2(a) is a schematic sectional side view of the apparatus similar to FIG. 1(a), particularly illustrating a step of thermally deforming a light attenuating portion on the optical fiber to have a reduced diameter. To practice the foregoing step, the micrometer 5 is rotationally actuated with an operator's hand to displace the movable clamp jig 4 by a predetermined distance in, such a direction that the optical fiber 10 is pulled by applying a tension force while the light attenuating portion of the same is kept hot.

In practice, the reason why light attenuation arises at a part of the optical fiber 10 which has been thermally deformed to exhibit a spherical contour or have a reduced diameter is not still clarified at present.

However, it has been confirmed from the results derived from a series of experiments that an attenuation value can be restricted by properly controlling a discharge condition, a rate of deformation of an optical fiber and a quantity of deformation of the optical fiber.

In addition, in a case where optical signals each having a wavelength of 1300 nm are successively transmitted through a single-mode optical fiber, it has been found that a maximum attenuation value of about 8 dB is attainable with the optical fiber of which part is thermally deformed by compression for formation of a spherical contour. Therefore, working conditions can arbitrarily be determined for an optical fiber of which attenuation value remains within the range of 8 dB or less.

Figure 3A:
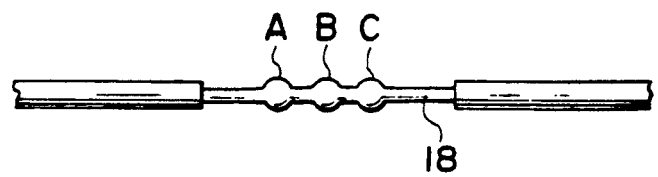
FIG. 3(a) is a side view of an optical attenuator using an optical accordance with a second embodiment of the present invention, particularly illustrating that an optical fiber is thermally deformed to produce three spherically contoured portions each serving as a light attenuating portion.

To attain an attenuation value in excess of 8 dB, it is recommendable that an optical fiber 18 be thermally deformed at three points A, B and C as shown in FIG. 3(a). In other words, a higher attenuation value can easily be attained by thermally producing the three spherically deformed locations A, B and C. Specifically, FIG. 3(a) is a side view of an optical attenuator in accordance with a second embodiment of the present invention, wherein the optical fiber used includes three spherically contoured portions each serving as a light attenuating portion.

Figure 3B:
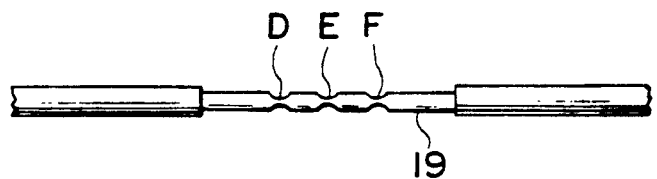
FIG. 3(b) is a side view of an optical attenuator using an optical fiber in accordance with a third embodiment of the present invention similar to FIG. 3(a), particularly illustrating that an optical fiber is thermally deformed to produce three light attenuating portions each having a reduced diameter.

Additionally, where an optical fiber is locally thermally deformed by pulling along its axis to produce a reduced diameter, it has been confirmed that light attenuation can be accomplished with a maximum attenuation value of 3 dB at a single location on the optical fiber. As shown in FIG. 3(b), an arbitrary attenuation value in excess of 3 dB can be attained by thermally deforming an optical fiber 19 at three locations D, E and F each having a reduced diameter. Specifically, FIG. 3(b) is a side view of an optical attenuator using an optical fiber in accordance with a third embodiment of the present invention, wherein the optical fiber includes three light attenuating portions each having a reduced diameter.

Figure 4A:
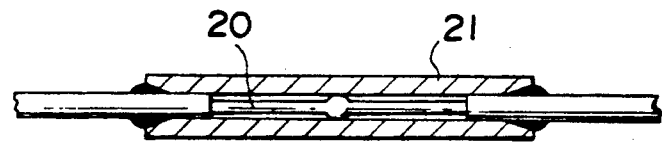
FIG. 4(a) is a sectional side view of a stationary inline type optical attenuator including a spherically contoured light attenuating portion in accordance with a fourth embodiment of the present invention.

Next, FIG. 4(a) is a sectional side view of a stationary inline type optical attenuator in accordance with a fourth embodiment of the present invention, wherein a single spherically contoured attenuation portion as shown in FIG. 1(b) is utilized for the optical attenuator. Alternatively, a single pulled attenuation portion as shown in FIG. 2(a) may be utilized for the optical attenuator.

As is apparent from the drawing, the optical attenuator is produced by airtightly encapsulating an optical fiber 20 in a glass tube 21 made of quartz with a spherically contoured portion located at the intermediate position thereof.

Figure 4B:
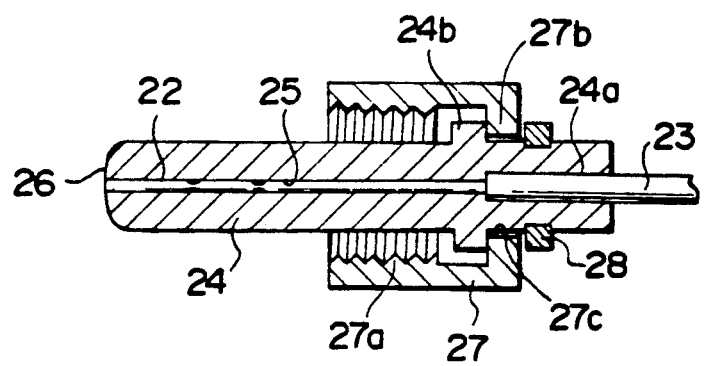
FIG. 4(b) is a sectional side view of a stationary type optical attenuator serving as an optical connector plug in accordance with a fifth embodiment of the present invention wherein two light attenuating portions each having a reduced diameter are formed on an optical fiber.
Figure 5A:
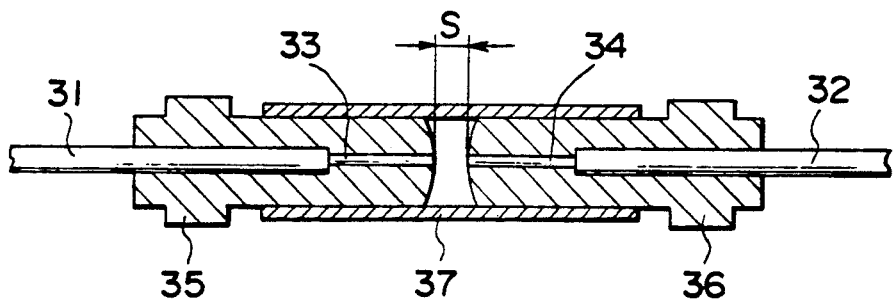
FIG. 5(a) is a sectional side view which schematically illustrates by way of example the structure of a conventional air gap type optical attenuator.
Figure 5B:
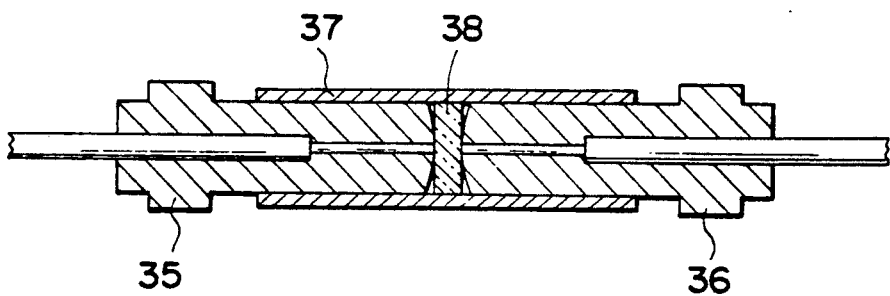
FIG. 5(b) is a sectional side view which schematically illustrates by way of example the structure of a conventional vaporized metal deposited film type optical attenuator.

FIG. 4(b) is a sectional side view of a stationary type optical attenuator serving as an optical connector plug in accordance with a fifth embodiment of the present invention, wherein an optical fiber having two locations each having a reduced diameter formed thereon is utilized for the optical attenuator.

As shown in the drawing, a ferrule 24 includes a central hole 25 having a stepped structure, and an optical fiber 22 having two locations each having a reduced diameter formed thereon is inserted through the central hole 25 from the stepped portion side, i.e., the right-hand side as seen in the drawing until the foremost end of a sheath 23 reaches the bottom of a stepped structure portion 24a. After completion of the inserting operation, the optical fiber 22 is immovably held in the central hole 25 with the aid of an adhesive.

The foremost end of the optical fiber 22 is cut along an end surface of the ferrule 24, and thereafter, the cut end surface of the optical fiber 22 and the end surface of the ferrule 26 are ground and polished to exhibit a predetermined contour.

The optical attenuator includes a coupling nut 27 having a plurality of female threads 27a and a central hole 27c formed therein, and a bottom 27b of the coupling nut 27 is brought in rotatable engagement with a flange 24b of the ferrule 24.

As is apparent from the drawing, a snap ring 28 serving as a stopper is fitted around the flange portion of the ferrule 24 in order to prevent the coupling nut 27 from being disconnected from the ferrule 24.

As described above, in contrast with all conventional optical attenuators inclusive of an air gap type optical attenuator and a vaporized metal deposited film type optical attenuator, according to the present invention, an optical fiber serving as an optical attenuator is constructed such that optical attenuation is accomplished by locally deforming the optical fiber itself without any cut/coupled surface included in the optical fiber for an optical attenuator. With such construction, a reflected return light loss arising at the light attenuating portion on the optical fiber is substantially reduced to a level of zero, and only a reflected return light is returned to a light source by light scattering inherent to the optical fiber which varies depending on a composition of the optical fiber.

In addition, in contrast with the conventional air gap type optical attenuator having such a problem that a light attenuation value varies due to multiple reflections caused in the space between the opposite surfaces of ferrules as an environmental temperature varies, the optical fiber of the present invention is constructed such that no multiple reflections occur at any location, resulting in variation of the attenuation value being reduced remarkably.

Additionally, since the optical attenuator of the present invention does not require repeatedly performing a mounting/dismounting operation and a contacting operation with ferrules, there is no possibility that a malfunction of scratching or the like should arise with the optical fiber.

While the present invention has been described above with respect to five preferred embodiments thereof, it should of course be understood that the present invention should not be limited only to these embodiments but various changes or modifications may be made without departure from the scope of the present invention as defined by the appended claims.

What is claimed is:

1. An optical attenuator comprising an optical fiber having at least one spherically contoured light attenuation portion disposed on said fiber, said attenuator being formed by heating a portion of a single continuous optical fiber, and physically deforming said portion of the single continuous optical fiber in the axial direction while maintaining said portion in a heated state.

2. The optical attenuator as claimed in claim 1, wherein said heating is provided by an opposing pair of discharge electrodes arranged on the opposite sides of said optical fiber with the same distances maintained between each discharge electrode and said optical fiber to generate arcs with said discharge electrodes.

3. The optical attenuator as claimed in claim 1, wherein said heating is provided by an opposing pair of gas burners arranged on the opposite sides of said optical fiber with the same distances maintained between each gas burner and said optical fiber to generate gas flames with said gas burners.

4. The optical attenuator as claimed in claim 1, wherein physical deformation of said single continuous optical fiber is performed by compression of the heated portion of said optical fiber.

5. The optical attenuator as claimed in claim 1, wherein physical deformation of said single continuous optical fiber is performed by applying a tension force to the heated portion of said optical fiber.

6. An optical attenuator comprising;

a glass tube, and an optical fiber airtightly encapsulated together with sheaths in said glass tube, said optical fiber having at least a light attenuating portion, said light attenuating portion being formed such that a part of said optical fiber is heated and then compressed in the axial direction of said optical fiber.

* * * * *